United States Patent [19]
Morioka

[11] Patent Number: 4,458,909
[45] Date of Patent: Jul. 10, 1984

[54] FRONT FENDER AND FORK ASSEMBLY

[75] Inventor: Minoru Morioka, Saitama, Japan

[73] Assignee: Honda Giken Kogyo Kabushiki Kaisha, Tokyo, Japan

[21] Appl. No.: 418,959

[22] Filed: Sep. 16, 1982

[30] Foreign Application Priority Data

Sep. 19, 1981 [JP] Japan .................. 56-139565[U]

[51] Int. Cl.³ .............................................. B62K 21/02
[52] U.S. Cl. ................................. 280/279; 180/219;
280/289 S; 280/152.2; 296/1 S
[58] Field of Search ............... 280/152.1, 152.2, 152.3,
280/289 S, 279, 276; 296/1 S; 180/219

[56] References Cited
U.S. PATENT DOCUMENTS 2,300,762 11/1942 Andrews ........................ 180/219

FOREIGN PATENT DOCUMENTS 441891 3/1927 Fed. Rep. of Germany ... 280/152.3

Primary Examiner—Joseph F. Peters, Jr.
Assistant Examiner—D. Lynn Fugate
Attorney, Agent, or Firm—Sughrue, Mion, Zinn, Macpeak, and Seas

[57] ABSTRACT

A front fender and fork assembly for a two-wheeled motor vehicle includes a front fender disposed over the front wheel, and a pair of leg comprising the front fork provided one on each side of the wheel, and is characterized by a pair of gently curved lateral projections formed on either side of the fender intermediate the ends thereof, and covering the front side of the legs in close proximity thereto.

9 Claims, 4 Drawing Figures

FRONT FENDER AND FORK ASSEMBLY

BACKGROUND OF THE INVENTION

1. Field of the Invention

This invention relates to a front fender and fork assembly for a two-wheeled motor vehicle, such as a motorcycle.

2. Description of the Prior Art

There is known a front fender and fork assembly for a two-wheeled motor vehicle which comprises a front fender disposed over the front wheel, and a pair of legs comprising the front fork provided one on each side of the front wheel. Each leg, laterally protrudes out of a recess formed at a generally central portion of both lateral sides of the fender. Therefore, a gap is provided between each leg and the fender. Mud and other foreign matter is likely to enter those gaps, and is difficult to remove.

SUMMARY OF THE INVENTION

It is an object of this invention to provide a front fender and fork assembly which eliminates the drawback of the prior art construction as hereinabove pointed out.

According to this invention, the above object is attained by a front fender and fork assembly comprising a front fender disposed over a front wheel, and a pair of legs comprising the front fork provided one on each side of the front wheel, characterized by a pair of gently curved lateral projections formed on each side of the fender, intermediate the ends thereof, and covering the front side of one of the legs in close proximity thereto.

The gently curved projections are also effective as a means for guiding the wind to cool a radiator or the engine of a two-wheeled motor vehicle on which the front fender and fork assembly of this invention is mounted.

DETAILED DESCRIPTION OF THE PREFERRED EMBODIMENT

Figure 1:
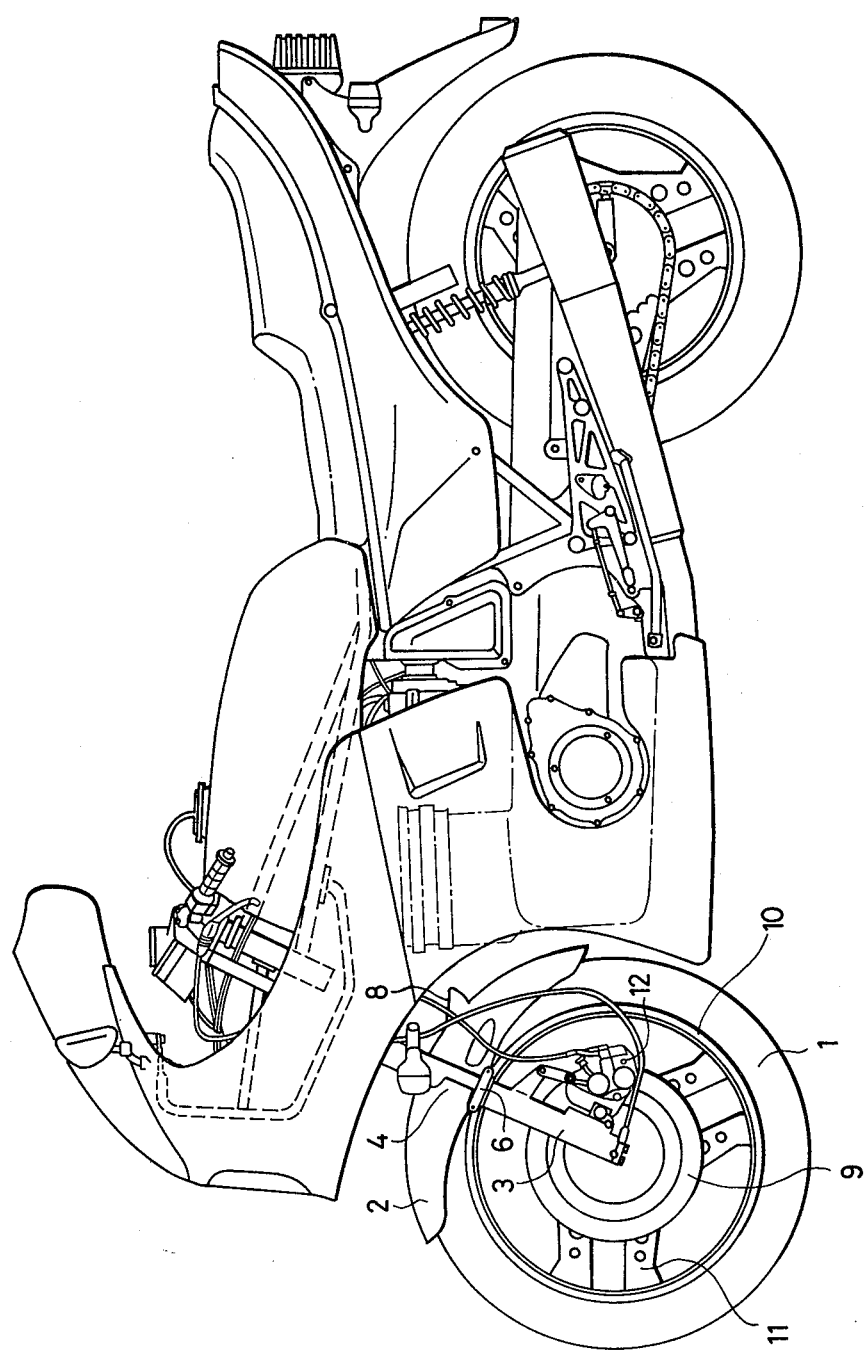
FIG. 1 is a side elevational view of a motorcycle provided with a front fender and fork assembly embodying this invention.

Referring to FIG. 1 of the drawings, there is shown a motorcycle provided with a front fender and fork assembly embodying this invention. The assembly comprises a front fender 2 disposed over a front tire 1, and a pair of legs comprising the front forks 3 provided on either side of the tire 1 as best shown in FIG. 3.

Figure 3:
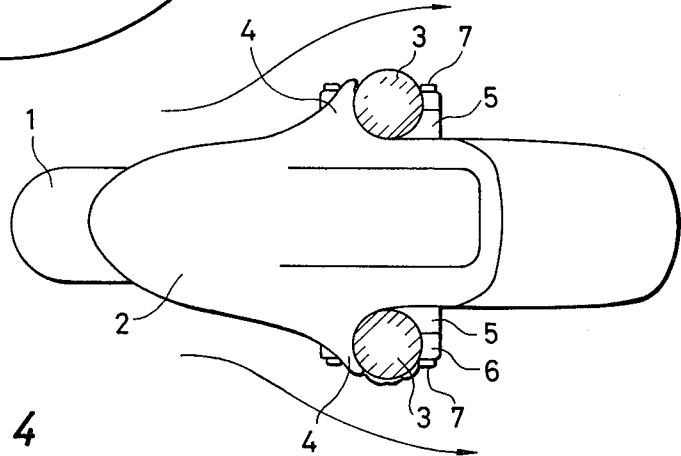
FIG. 3 is a top plan view thereof.

According to one salient feature of this invention, the fender 2 is provided on each side thereof with a gently curved lateral projection 4 covering the front side of a leg 3 as best shown in FIG. 3. Each projection 4 forms an integral part of the fender 2 intermediate the ends thereof. The gently curved projections 4 are located in close proximity to the legs 3, and therefore eliminate any gap found between the front fender and legs in the known device. The gently curved contour of the fender 2 is also effective for guiding the wind to cool the radiator or the engine of the motorcycle when it is running, as shown by a pair of arrowlines in FIG. 3.

Figure 4:
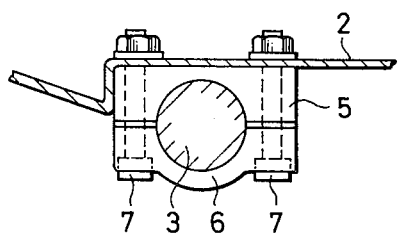
FIG. 4 is a cross sectional view showing the joint between the front fender and one of the legs.

The fender 2 may, for example, be formed from fiber-reinforced plastics. Each leg 3 is secured to the fender 2 by a plastic block 5 disposed in contact with the fender 2, a member 6 for holding the leg 3 against the block 5, and a pair of bolts 7 and nuts which hold the block 5 and the member 6 together, as best shown in FIG. 4. In FIG. 1, a disc plate 9 is supported on a wheel 10 through spokes 11. The braking function of the front wheel is attained by the disc plate 9 and a pad assembly 12. The member 6 is in alignment with the wheel 10 so that any water centrifugally released upwardly from the disc plate 9 during running can be blocked by the member 6, to thus prevent the water from being entered into a minute space between the legs 3 and the projections 4.

Figure 2:
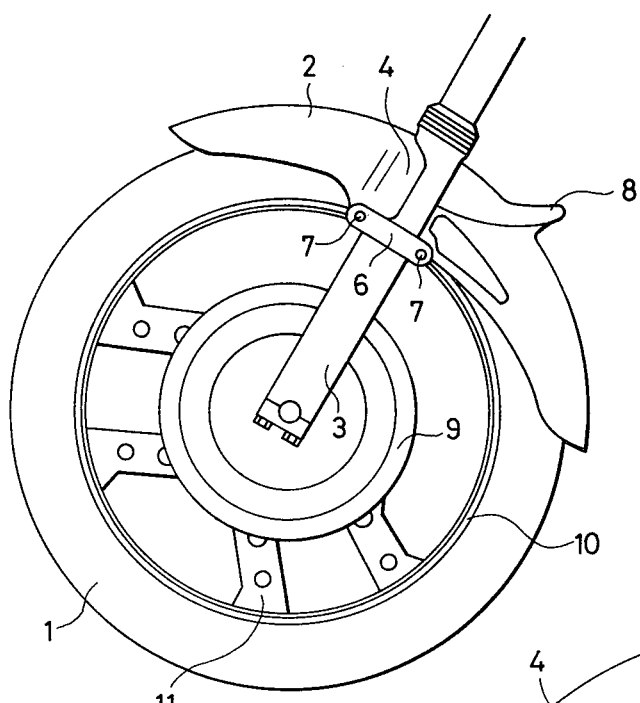
FIG. 2 is a fragmentary enlarged view of the front fender and fork assembly shown in FIG. 1.

According to another feature of this invention, the fender 2 is provided with a rearwardly projecting blade 8 which is located on the opposite side of the legs 3 from the projections 4, as shown in FIG. 2. The blade 8 forms an integral part of the fender 2, and is provided for further guiding cooling air toward the engine when the motorcycle is running.

What is claimed is:

1. In a front fender and fork assembly for a two-wheeled motor vehicle including a front fender disposed over a front wheel, and a pair of front legs comprising said fork provided on either side of said wheel, the improvement comprising a pair of gently curved lateral projections formed on each side of said fender intermediate the ends thereof, said lateral projections gradually sloping outwardly and covering a front side of each of said legs in close proximity thereto.

2. An assembly as set forth in claim 1, further including a blade provided on said fender on the opposite side of said fork from said projections, and projecting rearwardly and from an intermediate portion of said fender for deflecting air towards the motor of said motor vehicle, and each of said projections and said blade forming an intergral part of said fender.

3. An assembly as set forth in claims 1 or 2, wherein said projections impart a tapered contour to said fender along a front half thereof between a front end thereof and said leg of said fork, and define means for guiding wind past said fender and toward an engine of said vehicle.

4. An assembly as set forth in claim 3, wherein each of said legs of said fork is secured to said fender by a block disposed in contact with said fender, a member holding said fork against said block, and fastener means holding said block and said member together.

5. An assembly as set forth in claim 4, wherein said fender is formed from fiber-reinforced plastics.

6. A front fender and fork assembly for a motorcycle, comprising; a front fender disposed over a wheel, a pair of legs comprising said fork straddling said wheel, and means integral with said fender for preventing the accumulation of foreign debris between said fender and said legs.

7. A front fender and fork assembly as set forth in claim 6, said preventing means comprising a curved lateral projection on either side of said fender extending outwardly and partially circumferentially about a respective leg in close proximity thereto.

8. A front fender and fork assembly as set forth in claim 7, said lateral projections comprising means for deflecting cooling air toward an engine of said motorcycle.

9. A front fender and fork assembly as set forth in claim 8, further including further air deflector means provided on a more rearward portion of said fender and integrally therewith, for further guiding an air flow toward said engine.

* * * * *